(12) United States Patent
Comotto et al.

(10) Patent No.: US 11,208,759 B2
(45) Date of Patent: Dec. 28, 2021

(54) WEFT THREAD REFLECTION OPTICAL SENSOR IN A WEAVING WEFT FEEDER

(71) Applicant: ROJ S.r.l., Biella Bi (IT)

(72) Inventors: Renato Comotto, Biella (IT); Enzo Dandolo, Biella (IT); Matteo Fazzari, Biella (IT)

(73) Assignee: ROJ S.R.L., Biella Bi (IT)

( * ) Notice: Subject to any disclaimer, the term of this patent is extended or adjusted under 35 U.S.C. 154(b) by 0 days.

(21) Appl. No.: 16/560,112

(22) Filed: Sep. 4, 2019

(65) Prior Publication Data

US 2020/0080257 A1  Mar. 12, 2020

(30) Foreign Application Priority Data

Sep. 7, 2018  (IT) .......................... 102018000008415

(51) Int. Cl.
*D06H 3/12* (2006.01)
*G01V 8/14* (2006.01)

(52) U.S. Cl.
CPC .............. *D06H 3/125* (2013.01); *G01V 8/14* (2013.01)

(58) Field of Classification Search
CPC ...... D06H 3/125; G01V 8/14; G01N 21/6456; G01N 2201/062; G01N 2201/068;

(Continued)

(56) References Cited

U.S. PATENT DOCUMENTS 4,936,356 A * 6/1990 Ghiardo ............... D03D 47/367
139/452
5,251,673 A * 10/1993 Adachi .................. D03D 51/34
139/370.1

(Continued)

FOREIGN PATENT DOCUMENTS

CN  207081839 U  * 3/2018
CN  210734092 U  * 6/2020

(Continued)

OTHER PUBLICATIONS

Search Report for Italian Patent Application No. 102018000008415 dated May 2, 2019.

*Primary Examiner* — Michael P Stafira
(74) *Attorney, Agent, or Firm* — Pearne & Gordon LLP

(57) ABSTRACT

A reflection optical sensor (F1-F4) for the detection of a weft thread in a weaving weft feeder (P) comprises a light emitter (1) and a light receiver (2) assembled on a relative supply printed circuit board (3) and housed in an arm (A) of the weft feeder which projects towards the front part of the weft feeder (P) and extends alongside the weft feeder drum (D) whereon the weft thread coils are wound, so as to form a path of direct light radiation, from said light emitter (1) towards a respective reflective surface (R) placed on said drum (D), and of reflected light radiation, from said reflective surface (R) to said light receiver (2), for detecting the presence/absence of a weft thread running through said path. Said light emitter (1) and light receiver (2) are assembled with mutually parallel optical axes on said supply printed circuit board (3). The optical sensor further includes a screening means (8) of the reflected radiation coming from said reflective surface (R) and directed towards said light receiver (2).

13 Claims, 5 Drawing Sheets

(58) Field of Classification Search
CPC ........... G01N 21/05; G01N 2021/6471; G01N 21/87; G01N 2201/0634; G01N 2201/12; G01N 33/381; G01N 21/648; G01N 2021/6484; G01N 21/645; G01N 21/65; G01N 2201/0638; G01N 15/1459; G01N 2021/4742; G01N 2021/656; G01N 21/474; G01N 21/4795; G01N 21/53; G01N 21/554; G01N 21/64; G01N 21/6408; G01N 21/718; G01N 21/763; G01N 2201/0612; G01N 27/223; G01N 2021/399; G01N 2021/6419; G01N 2021/6434; G01N 2021/6441; G01N 2021/6478; G01N 2021/6482; G01N 2021/7786; G01N 2021/8609; G01N 2021/8663; G01N 2021/8917; G01N 2035/00148; G01N 2035/00554; G01N 2035/0486; G01N 2035/0489; G01N 2035/1051; G01N 21/0303; G01N 21/15; G01N 21/274; G01N 21/278; G01N 21/3504; G01N 21/39; G01N 21/57; G01N 21/6452; G01N 21/6454; G01N 21/6486; G01N 21/7743; G01N 21/7746; G01N 21/86; G01N 21/8901; G01N 21/954; G01N 2201/02; G01N 2201/06113; G01N 2201/101; G01N 2201/125; G01N 27/44721; G01N 33/346; G01N 33/4915; G01N 33/4925; G01N 35/00029; G01N 35/04; G01N 35/10; G01N 13/02; G01N 15/06; G01N 15/1425; G01N 15/1429; G01N 15/1434; G01N 15/1436; G01N 15/1463; G01N 2015/0073; G01N 2015/0693; G01N 2015/1486; G01N 2015/1493; G01N 2021/0382; G01N 2021/4707; G01N 2021/4716; G01N 2021/651; G01N 2021/9546; G01N 2030/201; G01N 2030/202; G01N 2030/347; G01N 2035/00306; G01N 2035/1032; G01N 21/03; G01N 21/47; G01N 21/49; G01N 21/553; G01N 21/6458; G01N 21/75; G01N 2201/0633; G01N 2201/0636; G01N 27/447; G01N 30/34; G01N 30/74; G01N 35/00871; G01N 35/1097; G01J 5/0803; G01J 5/0806; G01J 5/02; G01J 5/0205; G01J 5/0235; G01J 5/024; G01J 5/04; G01J 5/045; G01J 5/08; G01J 5/0831; G01J 5/084; G01J 5/0893; G01J 3/0208; G01J 3/0218; G01J 3/44; G01J 7/00; G01J 1/22; G01J 3/0224; G01J 1/02; G01J 1/0271; G01J 1/04; G01J 1/0429; G01J 1/0477; G01J 3/0291; G01J 3/18; G01J 4/04; G01J 2003/1861; G01J 3/0202; G01J 3/021; G01J 3/0216; G01J 3/1838; G01J 3/2803; G01J 5/0014; G01J 5/041; G01J 5/043; G01J 5/0815; G01J 5/0818; G01J 5/0821; G01J 5/0887; G01J 5/20; G01B 11/026; G01B 11/26; G01B 11/007; G01B 11/00; G01B 11/0616; G01B 11/14; G01B 5/25; G01B 9/02091; G01B 11/2441; G01B 11/2513; G01B 11/2518; G01B 15/00; G01B 9/02035; G01B 9/02038; G01B 9/02057; G01B 9/02069; G01B 9/02083; G01B 9/0209; G01B 11/105; G01B 11/12; G01B 11/22; G01B 11/2425; G01B 11/255; G01B 11/27; G01B 11/303; G01B 5/003; G01B 9/00; G01B 9/02044

See application file for complete search history.

(56) References Cited

U.S. PATENT DOCUMENTS

| | | | | |
|---|---|---|---|---|
| 5,329,961 | A * | 7/1994 | Bouvyn | D03D 47/3073 139/370.2 |
| 5,613,528 | A * | 3/1997 | Zenoni | D03D 47/367 139/452 |
| 6,044,871 | A * | 4/2000 | Zenoni | D03D 47/367 139/452 |
| 6,388,247 | B2 * | 5/2002 | Asada | G01L 1/248 250/221 |
| 8,965,553 | B2 * | 2/2015 | Ricci | D03D 47/367 700/140 |
| 9,007,568 | B2 * | 4/2015 | Tang | G01C 3/08 356/4.01 |
| 2003/0169421 | A1 * | 9/2003 | Ehbets | G01J 3/0278 356/328 |
| 2013/0276934 | A1 | 10/2013 | Ricci et al. | |
| 2014/0347650 | A1 * | 11/2014 | Bosch | G01S 7/4812 356/5.01 |
| 2020/0225439 | A1 * | 7/2020 | Nakamura | G02B 7/04 |

FOREIGN PATENT DOCUMENTS

| | | | | |
|---|---|---|---|---|
| DE | 10261247 | A1 * | 7/2004 | ............ B60S 1/0822 |
| EP | 0873961 | A2 | 10/1998 | |
| EP | 2655712 | B1 | 10/2013 | |
| JP | 4605975 | B2 * | 1/2011 | ............ G01N 21/552 |
| WO | 2005100658 | A1 | 10/2005 | |
| WO | WO-2013123161 | A1 * | 8/2013 | ............ B60R 11/04 |

* cited by examiner

WEFT THREAD REFLECTION OPTICAL SENSOR IN A WEAVING WEFT FEEDER

FIELD OF THE INVENTION

The present invention relates to a low-bulk reflection optical sensor, particularly suitable to be used for detecting the presence/absence of a weft thread in a weft feeder for weaving machines, and particularly for weaving looms.

Weft feeders for weaving looms are devices to be placed between the loom and the spools which feed the weft thread to the loom, in order to unwind the weft thread from the spools, thus making it available for the weft insertion devices while maintaining the weft thread tension within acceptable levels during the entire insertion operation thereof, therefore avoiding the sudden peaks in weft thread tension which on the contrary occur in weft looms devoid of a weft feeder along the weft thread insertion step. This object is achieved thanks to the presence of a winding assembly in the weft feeder, which winding assembly regularly draws out from the spools at a lower average speed the weft thread and collects the same in successive coils on a stationary cylindrical drum whereon it thus forms a thread reserve. Such thread reserve is then discontinuously picked up at high speed by the weft thread insertion devices of the loom (air nozzles or grippers).

A weft feeder is a device that has come into current use in weaving mills for many years now, from when modern high-speed looms were introduced, wherein direct feeding from the spools has never been technically possible. In their evolution over the years, in addition to the above mentioned basic functions weft feeders were enriched with additional control functions such as: verifying the constant presence of the thread at some crucial points of the weft feeder; adjusting the quantity of thread collected in the thread reserve; braking the outgoing thread in order to contain the dynamic effects caused by the sudden thread acceleration imparted by the weft thread insertion devices; measuring the length of the thread length picked up by the insertion devices; and, finally, stopping thread picking up as soon as a predetermined length thereof has been provided, by means of an electromagnetic stopping device incorporated in the weft feeder. These different functions are achieved thanks to a processing unit, on board of the weft feeder, which operates on the basis of sophisticated algorithms, starting from electrical signals which represent the thread presence/absence at the above-mentioned crucial points of the device.

Background of the Prior Art

These representative electric signals of the weft thread presence/absence are currently obtained—preferably with respect to the use of mechanical sensors—by means of optical sensors, each including a light emitter and a light receiver, such as for example a photodiode or a phototransistor. Said optical sensors are arranged on the weft feeder in such a way that the optical radiation path from a light emitter to a corresponding light receiver intercepts the weft thread path in a desired control position. Depending on the type of path of the optical radiation the optical sensors can be divided into two main categories: reflection optical sensors and barrier optical sensors.

In the reflection optical sensors, both the light emitter and the light receiver are placed on a support arm which projects from the base body of the weft feeder and extends parallel to the lateral surface of the drum whereon the weft thread reserve is wound. The optical radiation path between the above said two elements of the optical sensor is achieved by means of a respective reflective surface formed or fixed on the drum lateral surface facing said support arm. The position and inclination of the light emitter and light receiver must obviously be accurately predetermined according to the position and inclination of the respective reflective surface, in order to ensure that the light radiation emitted by the light emitter and reflected by said reflective surface reaches the light receiver accurately, thus imparting a good efficiency to the optical sensor.

In barrier optical sensors, on the contrary, the light emitter is placed on the outer surface of the stationary drum facing the afore-mentioned support arm, while the corresponding light receiver still remains in the position already described above, on said support arm. Therefore, this second category of optical sensor entails the advantage that the light radiation emitted by the light emitter is directly received by the light receiver, and therefore the relative electric signal representing the presence/absence of such light radiation (which signal is determined respectively by the absence/presence of a weft thread across the optical radiation path) is much more strong and stable than that of the previously described reflection optical sensor.

The reflection optical sensors lower sensitivity is, in fact, related to a much longer optical path of the light radiation than the one of barrier optical sensors, which longer optical path causes an attenuation of the detected light signal. Such greater length of the optical path obviously depends both on the fact that such optical path includes a forward branch and a return branch and, above all, on the need to position the light emitter and the light receiver very accurately according to a predetermined optical reflection angle, which necessarily requires the use of sufficiently large components. The resulting large overall dimensions of the reflection optical sensor does not allow to place it in close proximity to the drum whereon the thread reserve is wound, thus determining an even greater length of the optical path. Just due to the longer optical path, also the correct positioning of the reflection optical sensor components (light emitter, reflective surface, light receiver, and any possible protective glasses which entail a certain degree of refraction) is very tricky: small variations from the design positions lead to major variations in the optical sensor sensitivity due to the geometrical amplification of errors, negatively affecting the manufacturing repeatability. Finally, optical sensor sensitivity to the accumulation of dust on protective glasses and reflective surfaces becomes higher the longer the optical path is.

On the other hand, the barrier optical sensors, notwithstanding the advantage of a much shorter optical path of the light radiation (a few mm against a few cm of the reflection optical sensors), suffer from the major drawback of not being able to power the light emitter via standard electrical wires. As is well known to the skilled man in the art, this is because the stationary drum of the weft feeder is mounted freely rotating on the weft feeder rotating shaft, and is kept in a specific fixed angular position thereon by magnetic means only, so that a rotating coiler integral with said weft feeder shaft can be placed between the weft feeder body and the drum, to continuously wrap weft thread coils on said drum. Therefore, since there is no fixed mechanical connection joining the drum and the weft feeder body together, it is not possible to provide for a traditional electrical connection feeding the light emitters. The electrical power supply of the light emitters must therefore be obtained using independent means arranged inside the drum (batteries), or by use of induction feeding assemblies including a pair of induction coils housed in the weft feeder body and in the drum, respectively. However, the need for these additional components considerably increases the cost and the manufacturing complexity of barrier optical sensors, so that their use is limited to particularly valuable applications.

There is therefore a strong demand in the field, at present still unsatisfied, for a reflection optical sensor, for weaving weft feeders, which exhibits performance features comparable to those currently provided by barrier optical sensors—and thus a high detection sensitivity—and which is free from the drawbacks described above of traditional reflection optical sensors, i.e. which is of simple construction and provides for the use of low cost ordinary components.

The problem underlying the present invention is therefore to answer this unsatisfied demand, providing an extremely compact, easy to build and low-cost reflection optical sensor which nevertheless offers performances comparable to those of barrier optical sensors.

Within this problem, a first object of the present invention is to provide a reflection optical sensor of this type wherein, in the assembly step, it is not necessary to achieve a particular geometric alignment of the light emitter and the light receiver with respect to the reflective surface positioned on the weft feeder body, therefore making it possible to use small optical devices and to install them by a simple assembly process.

A second consequent object of the invention is to provide a reflection optical sensor wherein the overall path of the light radiation from the light emitter to the light receiver is significantly reduced with respect to that of traditional reflection optical sensors.

These objects are achieved, according to the present invention, by means of a reflection optical sensor for weaving weft feeders, having the features defined in claim 1. In the preamble of said claim the known features of reflection optical sensors are reported, as disclosed for example by EP-2655712. Further features of the present invention are defined in the secondary claims.

BRIEF DESCRIPTION OF THE DRAWINGS

The invention will now be better illustrated in detail with reference to a preferred embodiment thereof, illustrated in the attached drawings, wherein.

DETAILED DESCRIPTION OF THE INVENTION

According to the innovative idea of solution underlying the present invention, the inventors supposed to drastically reduce the path length of the light radiation, between the light emitter and the light receiver, to provide a reflection optical sensor offering a high sensitivity in detecting the weft thread.

The inventors considered that the high length of this optical path, which is around few centimetres in the traditional reflection optical sensors, is essentially determined by the high bulkiness of the light emitters and light receivers used in the art, and by the consequent impossibility to position the same sufficiently close to the weft feeder drum whereon the weft thread is wound.

The inventors thought therefore of using miniaturized light emitters and light receivers, renouncing to place them in an angular position according to the theoretical optical path of the light radiation, and instead positioning them with parallel optical axes. Preferably, SMD components (i.e. surface-mount components) are furthermore used for the light emitters and the light receivers, to allow an easy and automatable assembling process. The necessary sensitivity of detection, which would be fully compromised by assembling the pair of optical elements with parallel optical axes, is on the contrary surprisingly achieved, according to the invention, by using a screening diaphragm of the reflected radiation. Such a screening diaphragm is preferably preformed in a shielding plate of the printed circuit board whereon said pair of optical elements is assembled and has predefined length and orientation. Thanks to this innovative structure it is thus possible to convey onto the light receiver only the light radiation which is significant for the weft thread detection, and thus achieve an excellent sensitivity of the optical sensor, notwithstanding a mutual angular orientation between the light emitter and the light receiver, according to the reflection angle of the light radiation, is completely lacking. Hereinafter the technical aspects of a preferred embodiment of the invention will be described in greater detail, in accordance with the general principles indicated above.

Figure 1:
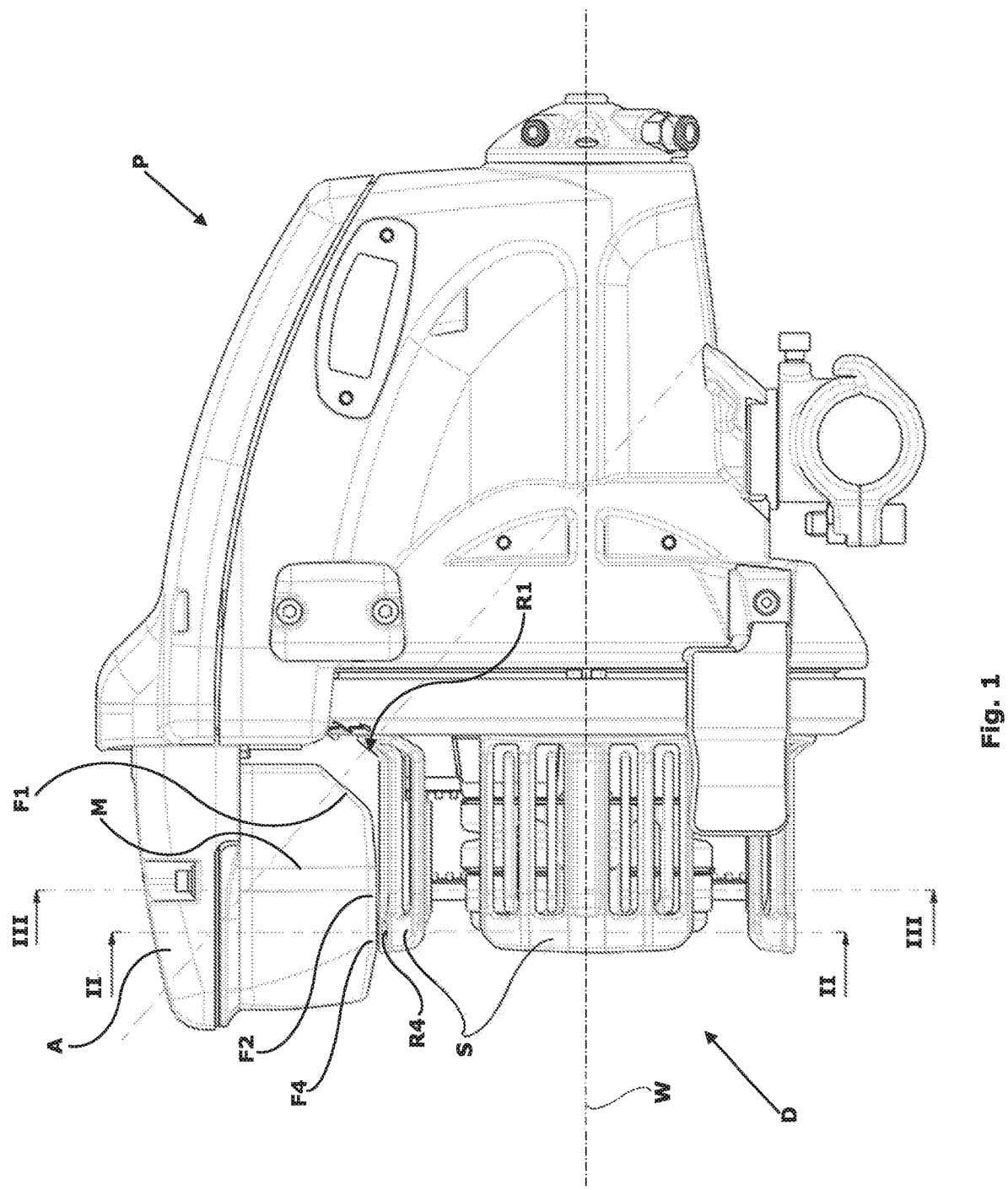
FIG. 1 is an overall side elevation view of a weaving weft feeder incorporating a plurality of reflection optical sensors according to the present invention.

FIG. 1 shows a standard weaving weft feeder P of the commercially available type which comprises, as is well known, a drum D for winding the weft thread, formed by four sectors S arranged on a circumference which is concentric to the axis W of the weft feeder rotating shaft. In the illustrated weft feeder, sectors S are sectors with adjustable radial position, to allow the drum D diameter to be varied; this technical detail, nevertheless, is totally irrelevant to the object of the invention. An arm A, projecting towards the front part of the weft feeder P and extending alongside drum D, carries a box M for housing the weft thread stopping device which operates electromagnetically and is often referred to as "stopper magnet" in the field. Said stopping device prevents the thread coils from getting out of the drum D, by means of the linear movement of a cursor C (FIG. 2) whose tip is inserted into a corresponding hole formed in the sector S immediately adjacent to the box M.

Figure 3:
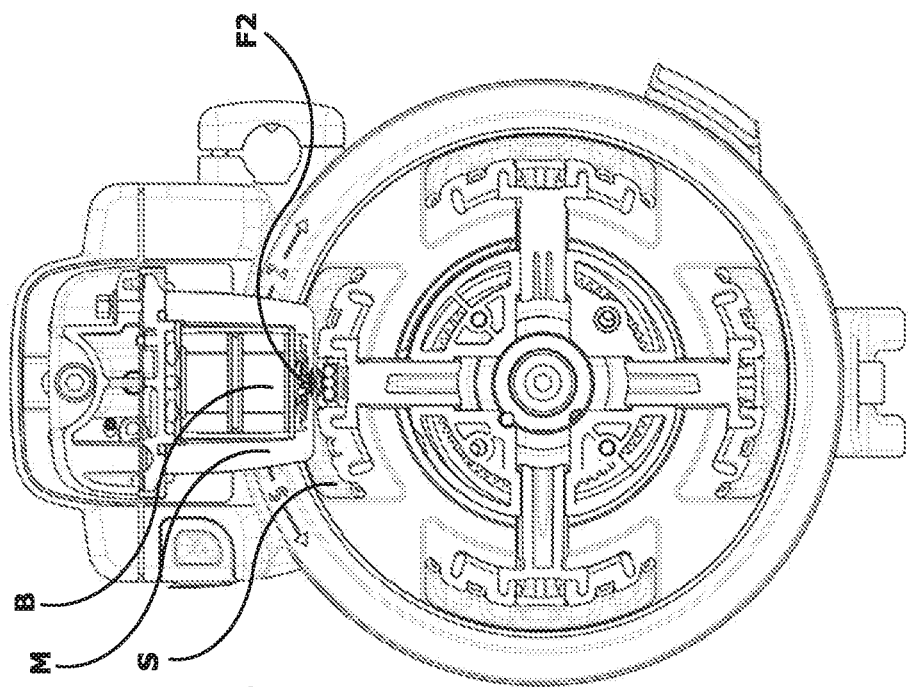
FIG. 3 is a cross-sectional view of the weft feeder, taken along the line III-III of FIG. 1, which illustrates the positioning of a reflection optical sensor according to the present invention, for detecting the completion of the thread reserve on the drum.
Figure 2:
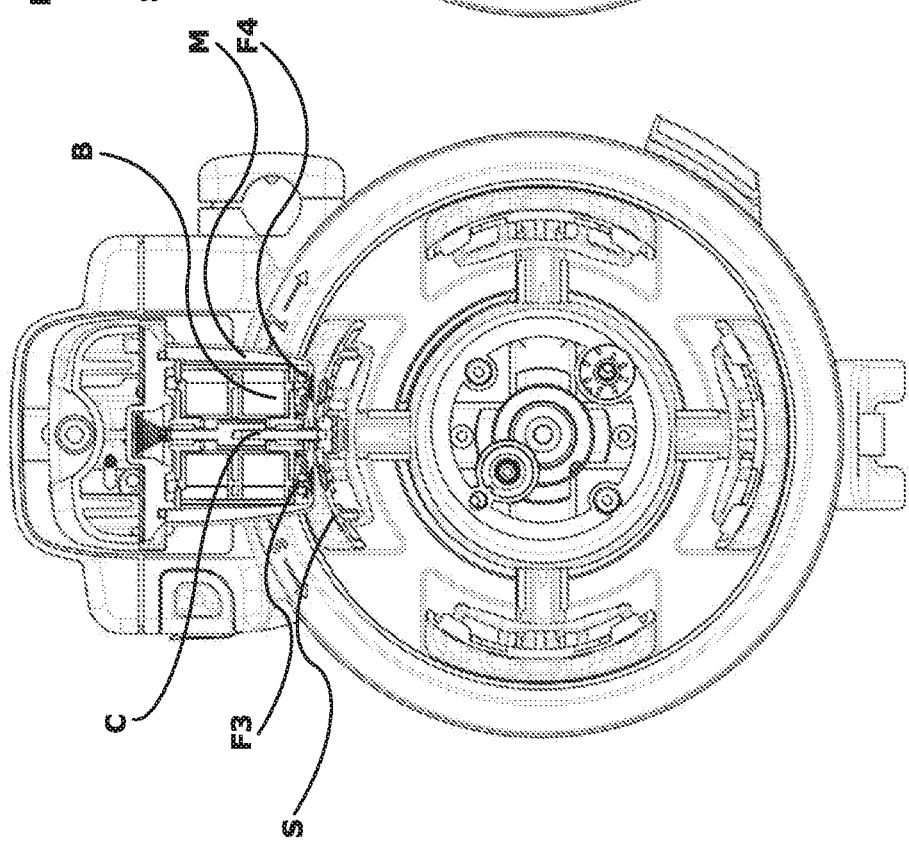
FIG. 2 is a cross-sectional view of the weft feeder, taken along the line II-II of FIG. 1, which illustrates the positioning of two reflection optical sensors according to the present invention, for detecting the thread coils outgoing the weft feeder, in the two possible rotation directions thereof.
Figure 5:
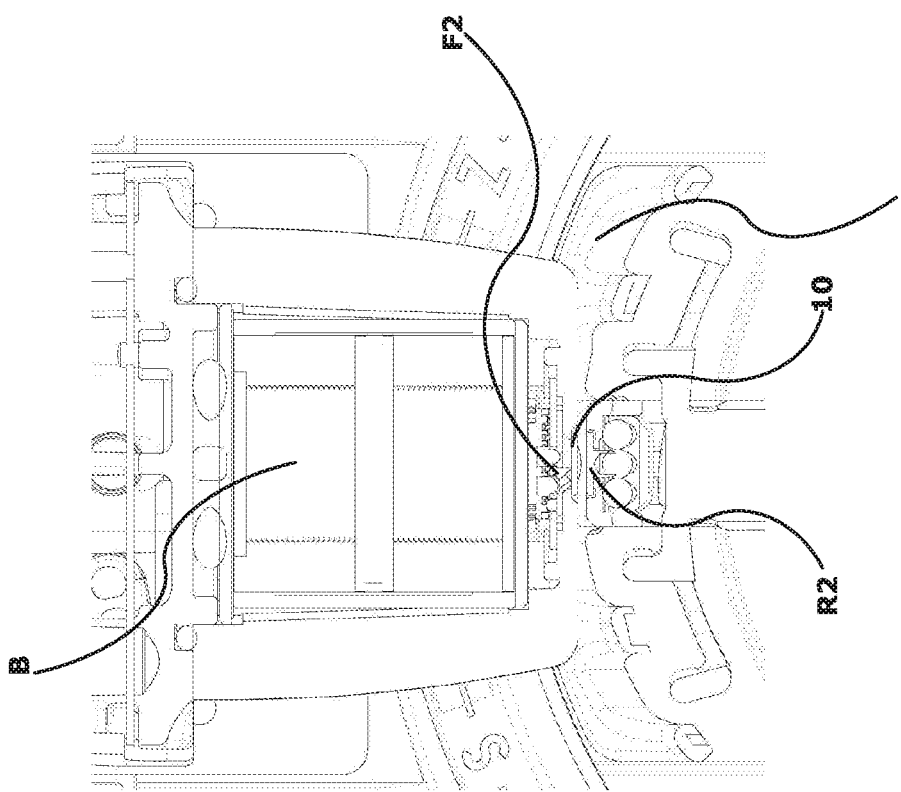
FIG. 5 is an enlarged view of a detail of FIG. 3, which illustrates the positioning of said optical sensor on the bottom wall of a box housing the weft thread stopping device.
Figure 4:
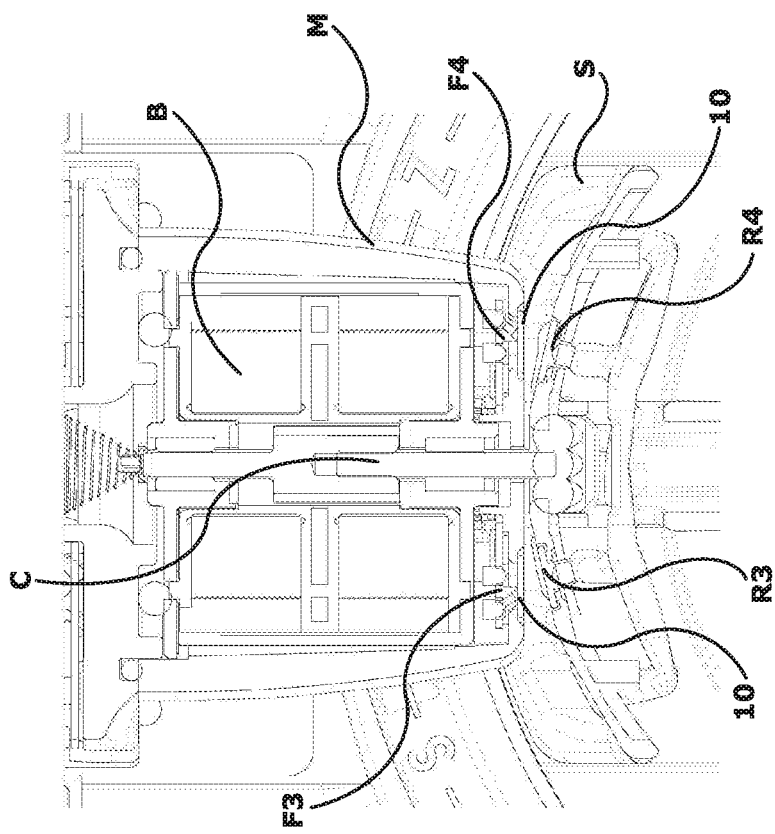
FIG. 4 is an enlarged view of a detail of FIG. 2, which illustrates the positioning of said two optical sensors, each comprising a light emitter and a light receiver, on the bottom wall of a box housing the weft thread stopping device.

A weft feeder of this type usually comprises four optical sensors for detecting the thread position at the afore-mentioned crucial points and, in particular:
- a first optical sensor F1, for detecting the entry of the thread coils onto drum D;
- a second optical sensor F2, for detecting the completion of the thread coils reserve on drum D (FIG. 3); and
- a third and a fourth optical sensor F3, F4 on the two sides of cursor C, for detecting the coils which come out of the drum D, respectively in the case of thread coils wound on the drum D in an anticlockwise direction of rotation S or a clockwise direction of rotation Z of the weft feeder (FIG. 2). The sense of rotation is referred to an observer looking at the exit side of the weft feeder (left side in FIG. 1).

Thanks to their very thin and compact shape, as better described below, the optical sensors according to the present invention can be installed inside the same box housing the stopping device and precisely on its bottom wall. In particular, optical sensors F2, F3 and F4 are housed in the area below the electric coil B which operates cursor C, as clearly seen in FIGS. 2 and 3, thus being placed a few millimetres from the opposite sector S of drum D, while optical sensor F1 is arranged behind the electric coil B, in the rear part of the box M (FIG. 1) and therefore at a slightly greater distance from the opposite surface of the same sector S, compared to optical sensors F2, F3 and F4. Reflective metallic disks R1-R4 are then fixed, in a per se well-known way, in correspondence of each optical sensor F on the underneath sector S; the outer surface of metallic disks R1-R4 is polished in order to help a better concentration of the reflected radiation.

Each individual optical sensor F of the present invention, whose structure is clearly illustrated in FIGS. 6-9, comprises a light emitter 1 and a light receiver 2 assembled on a printed circuit board 3 which supplies the necessary power and wiring. Unlike what happens in the optical sensors of the known type, the assembling of the optical elements 1, 2 on the printed circuit board 3 is made by maintaining the respective optical axes parallel, which axis are in fact both perpendicular to the printed circuit board 3 plane. This arrangement allows for a great ease of assembly and for the use of commercially available standard components which are therefore low-cost components. The optical elements 1 and 2 are preferably SMD components, and therefore surface-mount components, as already said above, and furthermore of the reverse-mount-type, i.e. with a component welded on the rear part of the printed circuit board 3 but apt to emit/receive the light radiation from the front part of the printed circuit board 3 thanks to a through-hole formed in such a circuit board 3.

In addition to making more compact the device of the invention, the use of reverse-mount components also allows for the use of a particular shielding plate 4 joined with the printed circuit board 3 complete with the optical elements 1 and 2. The shielding plate 4 exhibits a particularly innovative function which consists in improving the optical efficiency of the reflection optical sensor, that means increasing its sensitivity in detecting "difficult" (i.e. thin, light-coloured or reflective) weft threads, by the use of a mechanical screening means, preferably consisting in a cylindrical screening diaphragm 8 apt to convey to the optical detector of the light receiver 2 only a portion of the reflected radiation, namely the one aligned with the theoretical direction of reflection. Shielding plate 4 is preferably made of plastic material, through a standard injection moulding process, and has thus a very low cost of production.

The printed circuit board 3, on which the light emitter 1 and the light receiver 2 have already been assembled, is then joined with the shielding plate 4 and stably fixed thereto by means of glues or resins, inserting the optical source of the light emitter 1 and the optical detector of the light receiver 2, which protrude from the lower part of the printed circuit board 3, respectively into a through-hole 5 and into a cavity 6 both formed in the shielding plate 4, which are thus fully closed by said optical elements. The correct positioning of the shielding plate 4 onto the printed circuit board 3 is facilitated by two positioning feet 9 projecting from the shielding plate 4, which fit into corresponding holes provided in the printed circuit board 3. A septum 7, formed integral with the shielding plate 4, projects perpendicularly from both sides of said shielding plate 4 and fits into a corresponding slot formed in the printed circuit board 3, when said printed circuit board 3 and the shielding plate 4 are mutually joined.

The through-hole 5 receives the optical source of the light emitter 1 and shields its lateral emission of light radiation. This lateral shielding of the light radiation is also performed, to a greater extent, by the lower and upper walls of septum 7, thus safely preventing the light radiation diffused into the environment by the light emitter 1 from affecting the optical detector of the light receiver 2, which may otherwise contaminate the detection of the light radiation reflected by the reflective disk R.

Also for the purpose of limiting the access to the optical detector of the light receiver 2 to the reflected radiation by the reflective disk R only, the cavity 6 wherein such optical detector is housed is conversely completely blind except for the presence of the screening diaphragm 8, preferably elongated and cylindrical in shape, open at its opposite ends, whose axis is inclined in the direction of the reflected radiation source, i.e. of the reflective disk R corresponding to the optical sensor F of interest. In this way the screening diaphragm 8 is apt to convey towards the optical detector of the light receiver 2 only the most significant portion of the reflected optical radiation, i.e. the one closest to the theoretical direction of reflection, thus considerably increasing the optical sensor sensitivity—up to a level which is comparable to that of the barrier optical sensors—despite the fact that the two optical elements 1 and 2 forming the optical sensor are oriented with optical axes parallel to each other. The sensitivity of the optical sensor of the invention can also be modified, according to the specific application to which the weft feeder is intended, by changing the diameter, the length and possibly also the sectional shape of the cylindrical cavity of the screening diaphragm 8.

Figure 10:
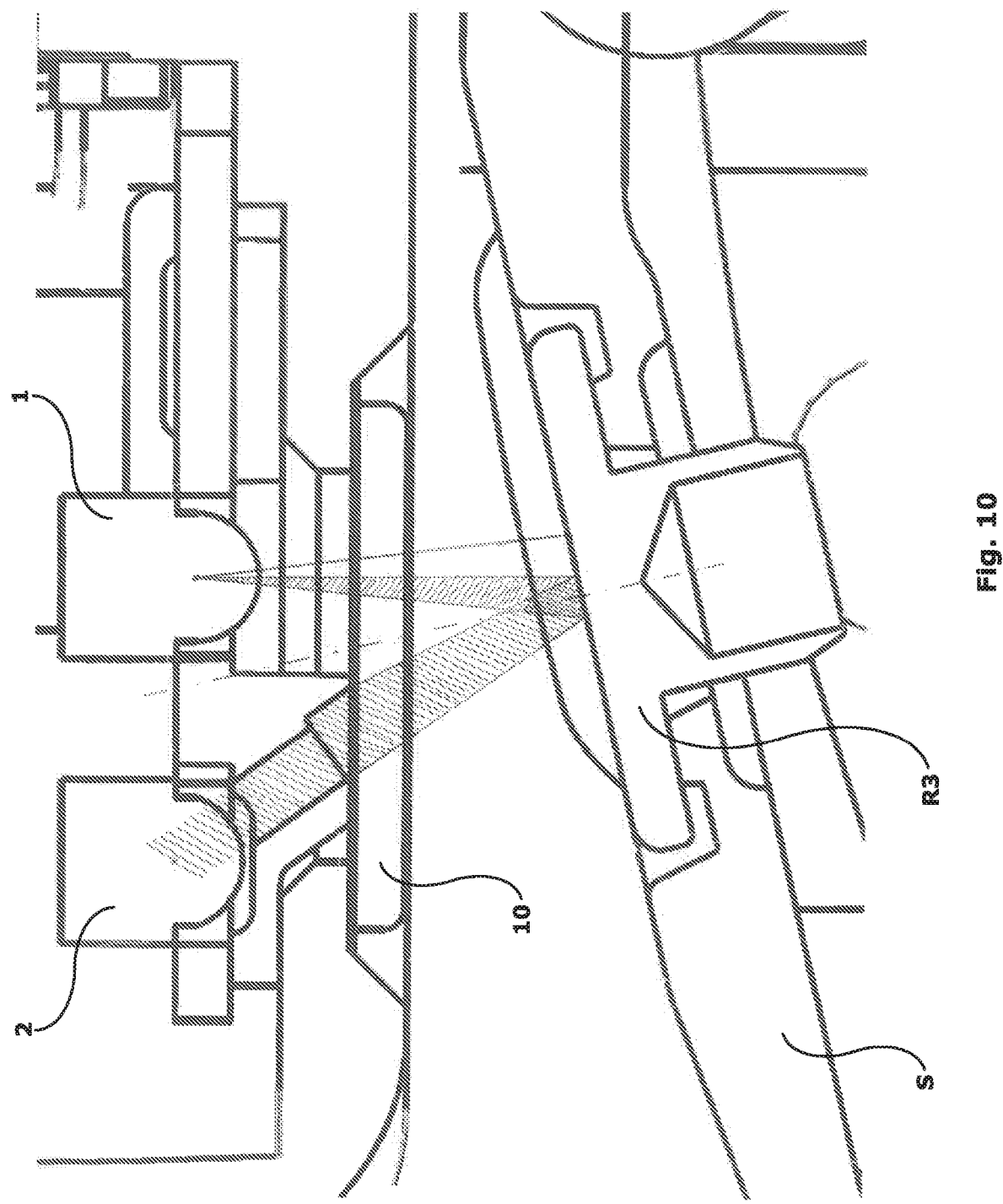
FIG. 10 is a view identical to FIG. 9, on an enlarged scale, wherein the light radiation optical path of the reflection optical sensor of the invention is additionally schematically depicted.

FIG. 10 schematically shows the path of the radiation emitted by the light emitter 1 and reflected by the reflective disk R3 towards the light receiver 2, from which it can be seen that about half of the light radiation cone emitted by the light emitter 1 is effectively exploited (the other half being symmetrically exploited when an identical device is used, in an overturned position, to form the optical sensor F4). As clearly shown in the drawing, the portion of the emitted light radiation cone exploited for the reflection towards screening diaphragm 8 has its centre falling approximately on the central point of the reflective disk R.

Figure 9:
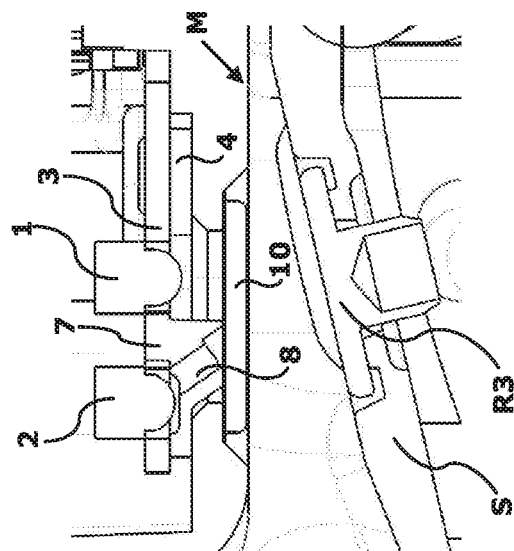
FIG. 9 is a cross-sectional view similar to FIG. 8, illustrating said shielding plate of the printed circuit board, the printed circuit board associated thereto, comprised with light emitter and light receiver, and also a portion of the underneath weft feeder drum which houses a reflective surface.
Figure 7:
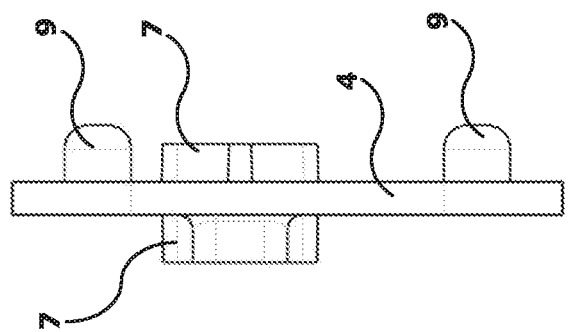
FIG. 7 is a side elevation view of the shielding plate of the printed circuit board of FIG. 6.
Figure 8:
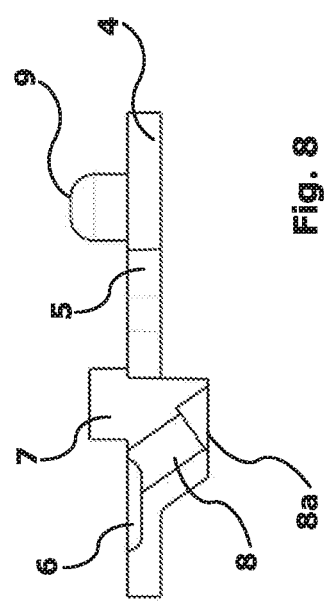
FIG. 8 is a cross-sectional view of the shielding plate of the printed circuit board of FIG. 6, taken along the line VIII-VIII of said Figure.
Figure 6:
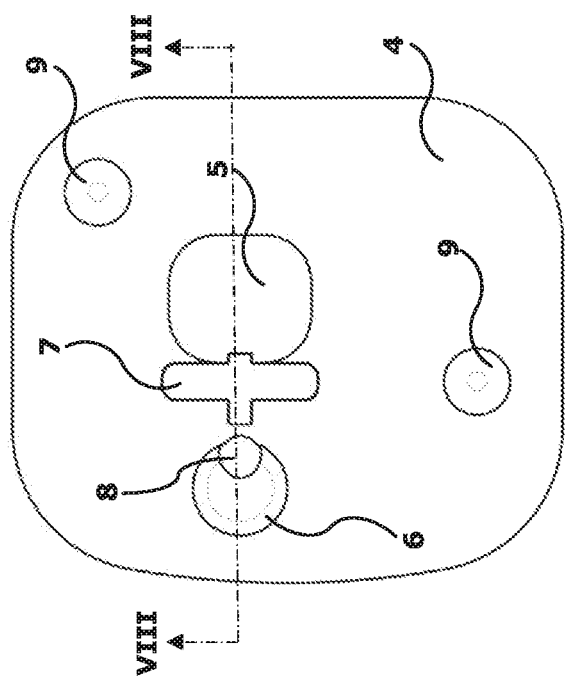
FIG. 6 is a top view of a shielding plate of the printed circuit board including the light emitter and the light receiver of one of the reflection optical sensors of the present invention.

As schematically illustrated in FIG. 9—where optical sensor F3 and the respective reflective disk R3 are illustrated in greater detail—the shielding plate 4 and the printed circuit board 3 joined together are mounted inside the box M in such a way that both the light emitter 1 and the light receiver 2, which form the optical sensor F3, face a same clear window 10 formed in the wall of said box M, so as to allow the passage of the direct and the reflected light radiation to and from the reflective disk R3 located on drum D. Preferably, the free end 8a of screening diaphragm 8 is positioned in close contact with the inner surface of such clear window 10 so that the internal channel of diaphragm 8 is protected against contamination by dust or dirt that may penetrate inside the box M.

The through-septum 7, in addition to the function already illustrated above of shielding that portion of the light radiation from the light emitter 1 which could directly affect the light receiver 2, also prevents that light radiation which diffuses throughout the printed circuit board 3, due to the semitransparency of the material thereof, from reaching the light receiver 2. Still for this purpose—i.e. to completely isolate the light receiver 2 from any light radiation other than that reaching it through screening diaphragm 8—both optical elements 1 and 2 and the surrounding area of the printed circuit board 3 are preferably coated with an opaque black layer of paint or resin, on the rear surface of the printed circuit board 3.

Finally, the shielding plate 4 and the printed circuit board 3 joined together are precisely fitted into the box M, by means of suitable positioning pins (not shown) formed in the box M itself, which engage with respective positioning holes provided on the printed circuit board 3, so as to make the relative positions of the clear window 10, the screening diaphragm 8 and the optical elements 1 and 2 perfectly consistent and suitable for the desired use. Still for the purpose of isolating from possible external contaminations the environment where the optical sensor is installed, both the positioning holes of the printed circuit board 3 and the entire perimeter of the printed circuit board 3 are sealed with a suitable resin to the inner wall of box M, so as to completely isolate from the external environment, and in particular from dust and liquids, all the volumes comprised between the printed circuit board 3 lower face and the inner surface of the box M lower wall, i.e. the area where the reflection optical sensors of the invention operate.

In the drawings, and specifically in FIGS. 6-9, is shown the special shape of the shielding plate 4 of optical sensor F3 which detects the thread coils getting out of the weft feeder. Obviously the shape of the shielding plate 4 for optical sensor F4 is perfectly symmetrical, while it is slightly different for each one of the optical sensors F1 and F2, obviously both as a function of the different local geometry available for the assembly of such shielding plate, and for the different position of the light receiver 2 of optical sensors F1 and F2 with respect to the reflective disks R1 and R2 which are the respective sources of the reflected radiation on the basis of which the axis inclination of the cylindrical screening diaphragm 8 is determined. Such variations in the shape of the shielding plate 4, however, are completely intuitive to a person skilled in the art, once the general parameters for designing such shielding plate are clearly defined, as disclosed above. Therefore, it is not deemed that any detailed illustration of the shielding plates 4 of optical sensors F1 and F2 is further required in the drawings, not to unnecessarily burden the present description.

From the foregoing description it should be now clear how the reflection optical sensor of the present invention has fully achieved the intended objects.

In fact, thanks to the particular design of this optical sensor, which does not require a particular geometrical alignment of the light emitters and light receivers in relation to their respective reflective surfaces placed on the weft feeder body, it is possible to use small-sized devices designed for an eased assembling on the printed circuit board, according to the reverse-mount well-known technique, where the optical axes of said light emitters and light receivers are perpendicular to the printed circuit board plane. The first object of the invention is thus achieved.

Thanks to this first result it is then possible to achieve also the second object of the invention, namely a significantly shorter path of the reflected light radiation with respect to that of traditional reflection optical sensors. As a matter of fact, the small size of the light emitters 1 and light receivers 2 and their assembling on a single plane allow positioning the optical sensors of the invention into the small area comprised between the electrical coil B of the thread stopping device and the bottom wall of the housing box M of such device, thus making it possible to drastically reduce the length of the optical path of the light radiation from the light emitter 1 to the light receiver 2.

By achieving these objects, the optical sensor of the present invention offers several advantages with respect to the previously described reflection optical sensors of the known art.

A first advantage is a high sensitivity of detection of the weft thread. This advantage derives from the extreme compactness of the structure of the optical sensor of the invention, which allows it to be positioned in close proximity to the drum. The shortness of the reflected radiation optical path makes it possible to have low signal attenuation and therefore to achieve a high sensitivity of detection of the weft thread. The high sensitivity thus obtained guarantees in turn to the optical sensor a wider range of self-correction to cope with the accumulation of dust during operation; the system is therefore ultimately also less sensitive to dirt.

A second advantage is cost reduction. This advantage is obtained by using standard optical components and by assembling them on the printed circuit board not according to the theoretical optical path of the reflected radiation but with parallel optical axes. This makes it possible to have a higher positioning tolerance of the optical elements and therefore to use automatic assembly procedures.

A third important advantage is then a better manufacturing repeatability, also considering different supply lots of the single components, as a consequence both of the lower sensitivity to the positioning precision of the components, and of the particularly short optical path and the simple assembly scheme of the optical elements, with parallel axes.

A last advantage which, however, is in common with the reflection optical sensors of the known type, is finally that no powered component is required inside the drum, but exclusively reflective disks R placed on the drum D surface.

It is understood, however, that the invention is not to be considered limited to the particular arrangement illustrated above, which is only a preferred embodiment thereof, but that different variants are possible, all within the reach of a person skilled in the art without departing from the scope of protection of the invention, which is therefore uniquely defined by the following claims.

The invention claimed is:

1. A reflection optical sensor for the detection of a weft thread in a weaving weft feeder, comprising a light emitter and a light receiver assembled on a relative supply printed circuit board and configured to be housed in an arm of the weft feeder which projects towards a front part of the weft feeder and extends alongside a weft feeder drum whereon weft thread coils are wound, so as to form a path of direct light radiation, from said light emitter towards a respective reflective surface placed on said weft feeder drum, and of reflected light radiation, from said reflective surface to said light receiver, for detecting the presence or absence of a weft thread running through said path, wherein said light emitter comprises a light emitter lens and said light receiver comprises a light receiver lens, wherein said light emitter and light receiver are assembled on said supply printed circuit board such that an optical axis of the light emitter lens is arranged mutually parallel to an optical axis of the light receiver lens, both said optical axes being perpendicular to a supply printed circuit board plane, and wherein the optical sensor further includes a screening diaphragm of the reflected light radiation coming from said reflective surface and directed towards an optical detector of said light receiver, said screening diaphragm being configured to convey to the optical detector of the light receiver only a portion of the reflected light radiation, and said screening diaphragm having a cylindrical shape, whose cylinder axis is inclined with respect to the optical axis of the light receiver lens.

2. The reflection optical sensor according to claim 1, wherein said screening diaphragm is formed on a shielding plate joined with said supply printed circuit board.

3. The reflection optical sensor according to claim 2, wherein said cylinder axis is substantially aligned in a direction of said reflective surface.

4. The reflection optical sensor according to claim 3, wherein said screening diaphragm opens into a blind cavity of the shielding plate, in which said blind cavity the optical detector of the light receiver is also housed.

5. The reflection optical sensor according to claim 4, wherein said light receiver fully closes said blind cavity in a final assembling position of the shielding plate with the supply printed circuit board.

6. The reflection optical sensor according to claim 5, wherein said shielding plate includes a septum which perpendicularly projects from both sides of said shielding plate and which is inserted into a corresponding slot formed in said supply printed circuit board between said light emitter and said light receiver, in the final assembling position of the shielding plate with the printed circuit board.

7. The reflection optical sensor according to claim 1, wherein said light emitter and light receiver are surface-mount electronic components.

8. The reflection optical sensor according to claim 7, wherein said light emitter and light receiver are reverse-mount electronic components which are assembled on a rear part of said supply printed circuit board but are configured to emit the direct light radiation and receive the reflected light radiation, respectively, from a front part of said supply printed circuit board by way of a through-hole formed in said supply printed circuit board.

9. The reflection optical sensor according to claim 1, wherein said light emitter and light receiver and a surrounding area of said supply printed circuit board are coated with an opaque black layer of paint or resin, at a rear surface of the supply printed circuit board.

10. A weaving weft feeder comprising the reflection optical sensor according to claim 1, wherein said optical sensor is positioned onto a bottom wall of a box housing a weft thread stopping device, in correspondence of a clear window.

11. The weaving weft feeder according to claim 10, wherein a free end of said screening diaphragm is placed in contact with an inner surface of said clear window.

12. The weaving weft feeder according to claim 11, wherein a shielding plate is provided with coupling feet with the supply printed circuit board and said supply printed circuit board is provided with positioning holes for the engagement with corresponding positioning pins provided on the bottom wall of said box.

13. The weaving weft feeder according to claim 12, wherein said positioning holes of the supply printed circuit board and an entire perimeter of the supply printed circuit board are sealed with resin to an inner wall of the box.

* * * * *